Jan. 10, 1967 R. J. VAN DE GRAAFF 3,296,826
INSULATING SHAFT

Original Filed June 29, 1960 2 Sheets-Sheet 1

3,296,826
INSULATING SHAFT

Robert J. Van de Graaff, Lexington, Mass., assignor to High Voltage Engineering Corporation, Burlington, Mass., a corporation of Massachusetts
Original application June 29, 1960, Ser. No. 39,539, now Patent No. 3,239,702, dated Mar. 8, 1966. Divided and this application Mar. 4, 1966, Ser. No. 531,865
3 Claims. (Cl. 64—1)

This application is a division of application Serial No. 39,539, filed June 29, 1960, for Multi-Disk Electromagnetic Power Machinery, now U.S. Patent No. 3,239,702.

This invention relates to an insulating shaft for the transmission of mechanical force between regions having substantially different electrical potentials. More specifically, this invention comprehends an insulating shaft which includes a multiplicity of alternating dished conductive members and correspondingly dished insulating members in nesting relationship.

Figure 1:
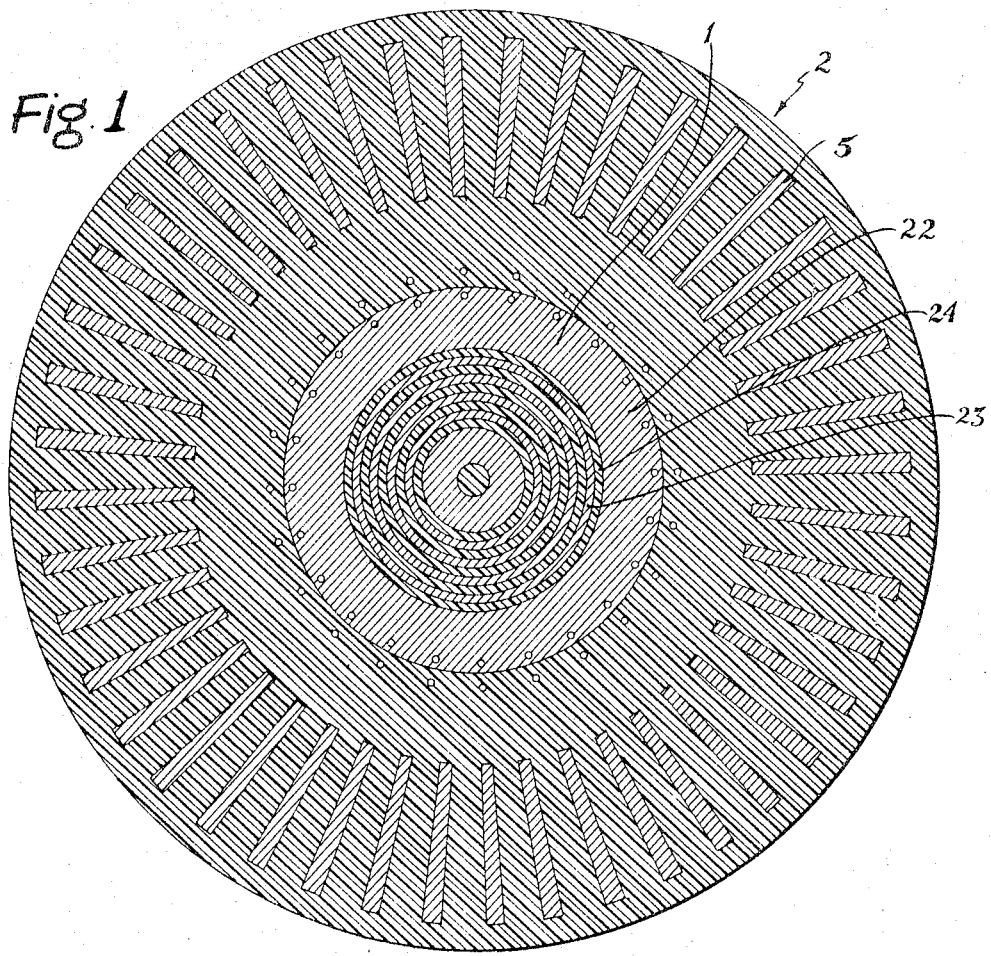
Figure 2:
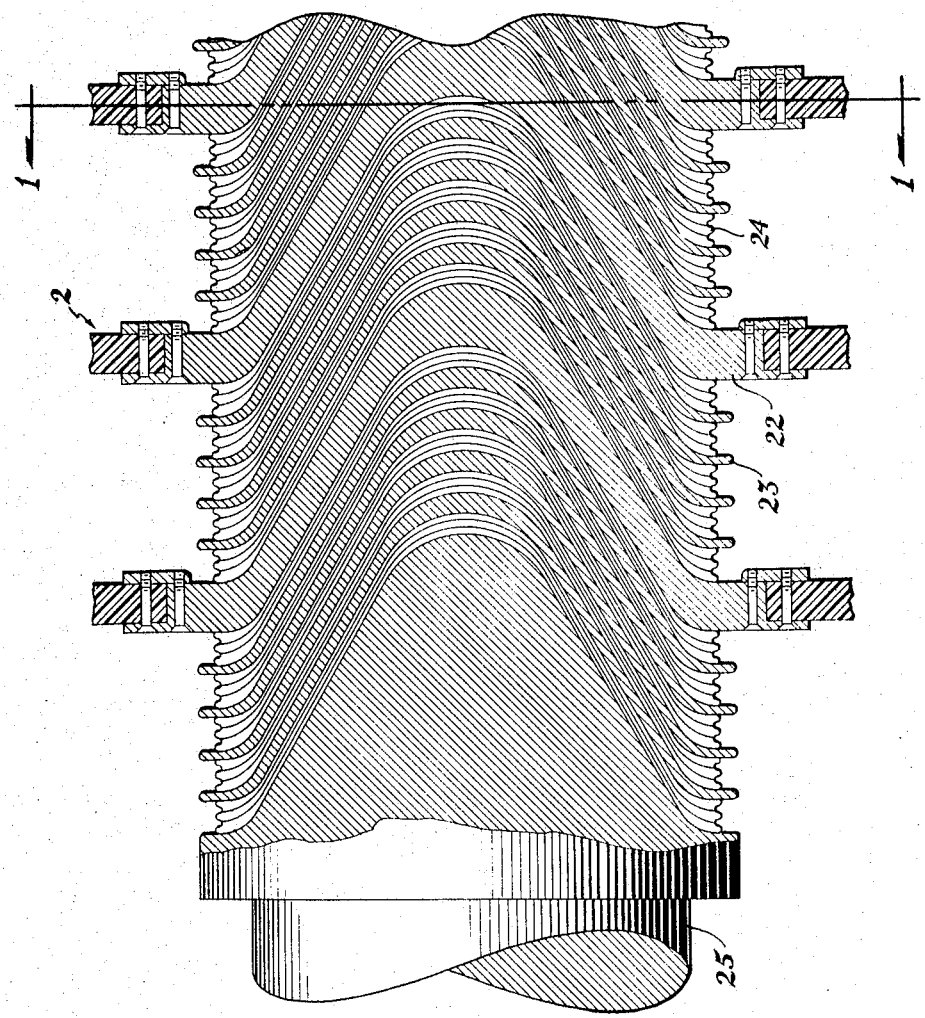

The invention may best be understood from the following detailed description thereof, having reference to the accompanying drawings, in which:

FIGURE 1 is a section of the rotor, including the shaft, of a multidisk inductor generator embodying the principles of the invention disclosed and claimed in my said co-pending application, Serial No. 39,539, said shaft embodying the principles of the present invention; and FIGURE 2 is a side elevation, partly in longitudinal central section, of the insulating shaft of FIGURE 1.

Referring to the drawings, the generator therein shown includes a shaft 1 upon which are mounted a plurality of disks 2. This shaft must be very strong not only mechanically but also electrically. The shaft 1 is suitable for use with high voltage. The disks 2 are mounted upon thick metal members 22 which are dished as shown and are mutually separated by a series of alternating thin metal members 23 and insulating layers 24. The shaft 1 terminates at each extremity in solid metal cylinders 25 which are separated from the nearest thick metal member 22 in the same manner as that in which adjacent thick metal members 22 are separated from one another. The more acute the angle of dishing, the greater the mechanical strength. The metal members 22, 23 provide the mechanical strength and could be of high quality steel. The insulating layers 24 provide the electrical insulation and may be, for example, formed of laminated fiberglass, wherein layers of fiberglass are impregnated with an epoxy resin. The metal members 22, 23 may be cemented or glued to adjacent insulating layers 24.

In the shaft of the invention, the electric field is perpendicular to the laminations in the insulating layer 24, so that maximum insulation is provided. Moreover, any bending moment results in a force compressive perpendicular to the laminations, so that the bending moment is not limited by any tendency to pull the laminations out, but only by plastic flow; there is virtually no tension on any glued seal. Therefore, the shaft tends to approximate the mechanical properties of the metal rather than those of the insulating layer 24.

The shaft of the invention loses very little in reduction of flashover length, since the dishing effect does not affect the distance between equi-potential planes at the periphery of the shaft; moreover, the thin metal members 23 taper to very thin dimensions at the periphery of the shaft, so that only the thickness of the thick metal members 22 appreciably reduces the possible axial insulator flashover length, and the resultant reduction is about one-fifth. The shaft of the invention also provides voltage subdivision and is well suited to the provision of protective spark gaps at frequent intervals as protection against surges. The shaft of the invention also includes means for connecting it electrically with the rest of the generator; in an electrostatic belt-type generator, for example, voltage-dividing resistors are required in the column, since the belt cannot be used to directly control the potential distribution along the column. Moreover the solid insulator in the shaft of the invention has a good electrical factor of safety because edge effects are much reduced and the voltage gradient is perpendicular to the laminations; and the total voltage across any given thickness is small. The dishing effect is taken in a way so as to minimize curvature effects. For example, near the axis of the shaft the radius of curvature of the conductive surfaces is large compared with the thickness of the insulating material.

Having thus described the principles of the invention together with an illustrative embodiment thereof, it is to be understood that although specific terms are employed they are used in a generic and descriptive sense and not for purposes of limitation, the scope of the invention being set forth in the following claims.

I claim:
1. An insulating shaft for the transmission of mechanical force between regions having substantially different electrical potentials comprising solid metal end portions, a multiplicity of alternating dished conductive members and correspondingly dished insulating members in nesting relationship between said end portions, means securing said conductive members, insulating members, and end portions together to form a substantially rigid shaft, said conductive members being much more rigid than said insulating members.

2. An insulating shaft for the transmission of mechanical force between regions having substantially different electrical potentials comprising solid metal end portions, a multiplicity of alternating dished conductive members and correspondingly dished insulating members in nesting relationship between said end portions, means securing said conductive members, insulating members, and end portions together to form a substantially rigid shaft, said conductive members being much more rigid than said insulating members, the curvature and spacing of said conductive members being such that where the electric potential gradient is high in said insulating members the electric field is substantially uniform.

3. An insulating shaft for the transmission of mechanical force between regions having substantially different electrical potentials comprising solid metal end portions, a multiplicity of alternating dished conductive members and correspondingly dished insulating members in nesting relationship between said end portions, means securing said conductive members, insulating members, and end portions together to form a substantially rigid shaft, said conductive members being much more rigid than said insulating members, said conductive members being tapered towards their peripheries so as to minimize reduction in surface flashover length caused by the introduction into said shaft of said conductive members.

References Cited by the Examiner
UNITED STATES PATENTS

| | | | |
|---|---|---|---|
| 497,905 | 5/1893 | Beekman | 64—2 |
| 2,084,080 | 6/1937 | D'Aubarede | 64—27 |
| 2,910,843 | 11/1959 | Happ et al. | 64—27 |

FRED C. MATTERN, Jr., *Primary Examiner.*

HALL C. COE, *Examiner.*